United States Patent Office 3,565,865
Patented Feb. 23, 1971

3,565,865
POLYMERIC MACROPOLYESTERS OF PHENYL-
INDANE DICARBOXYLIC ACIDS
Delbert H. Meyer, Highland, Ind., assignor to Standard
Oil Company, Chicago, Ill., a corporation of Indiana
No Drawing. Continuation-in-part of application Ser. No.
552,710, May 25, 1966. This application Nov. 12, 1969,
Ser. No. 876,082
Int. Cl. C08g 17/08
U.S. Cl. 260—75                                    4 Claims

ABSTRACT OF THE DISCLOSURE

Novel fiber- and film-forming polymeric macropolyesters derived from 3-(carboxyphenyl)-1,1,3-trimethylindane carboxylic acids and a diol differ from the linear polymeric macropolymethylene terephthalates and linear macropolymethylene isophthalate-terephthalates in structure and to the sense of touch.

RELATED APPLICATION

This is a continuation-in-part of copending patent application Ser. No. 552,710, filed May 25, 1966 now abandoned.

BACKGROUND OF INVENTION

U.S. Pat. 2,873,262 issued Feb. 10, 1959 to John C. Petropoulos discloses alkyd resins prepared from a polyhydric alcohol and a carboxyphenyl substituted trialkylindane carboxylic acid. Example 12 of said patent describes the preparation of such an alkyl resin from ethylene glycol and 3-(p-carboxyphenyl)-1,1,3-trimethyl-5-indane carboxylic acid at 230–235° C. and discloses that the resulting alkyd resin has an acid number of 17–8 and a softening point of 165° C. However, no molecular weight is given for such resin product.

By repeating said Example 12 (with reference back to Example 4 for reaction temperature of 230–235° C.) three resin preparations are made from 160 grams ethylene glycol and 800 grams 3-(p-carboxyphenyl)-1,1,3-trimethyl-5-indane carboxylic acid (PIDA) to obtain resin product for molecular weight determination. In these preparations there is used a reaction vessel having a stirrer, means for measuring the temperature of the reaction mixture, a reflux condenser with volume calibrated water condensate collector, a gas inlet for $CO_2$ sparging of reaction mixture and an electrically heated mantle for the reaction vessel. One resin preparation (Run 1) was conducted by combining all the reactants and heating the stirred mixture from ambient temperature to reaction temperature. The other two preparations (Runs 2 and 3) were conducted by adding 200 grams of PIDA to the 160 grams of stirred ethylene glycol at ambient temperature, heating this stirred mixture to reaction temperature, then adding the remaining 600 grams of PIDA in three equal 200 gram portions when about one-half of the theoretical amount of by-product water from reaction of the preceding PIDA-ethylene glycol reactants had been collected and then continuing the reaction until substantial completion of esterification was indicated by no further increase in collected by-product water. Runs 1 and 3 were made to 237° C. and Run 2 at 275° C. maximum reaction temperatures. The duration of the reactions were measured from the time the first drop of by-product water was collected until the reaction was terminated at substantial completion of esterification. The molecular weights (average number M.W.) of the three resin products were determined by vapor pressure osmometry in tetrahydrofuran. The following table summarizes conditions for these three preparations and the characteristics: acid number, softening point and average number molecular weight ($\overline{M}n$) of the three resin products.

REACTANTS: 800 GRAMS PIDA, 160 GRAMS ETHYLENE GLYCOL

|  | Run 1 | Run 2 | Run 3 |
|---|---|---|---|
| Method | Charge all reactants. | Charge PIDA in 4 portions of 200 g. | Charge PIDA in 4 portions of 200 g. |
| Reaction temp.[1] | 188–237° C | 200–275° C | 200–237° C. |
| Duration, hrs. | 5.75 | 6.25 | 6.5. |
| Acid No. | 17.6 | 19.1 | 20.0. |
| Softening point | 354° F. (179° C.). | 358° F. (181° C.). | 322° F. (161° C.). |
| Resin product $\overline{M}n$ | 3,100 | 2,940 | 2,530. |

[1] Lower temperature is reaction temperature noted when first drop of by-product water collected.

The foregoing three resin products of acid number of 17.6–20.0, softening point of 161–181° C. and $\overline{M}n$ of 2530–3100 are typical of ethylene glycol derived alkyd resins of U.S. Pat. No. 2,873,262.

SUMMARY OF INVENTION

The novel macropoly 3-(phenylcarboxylate)-1,1,3-trimethylindane carboxylate-diol polyesters of this invention have the repeating unit structure:

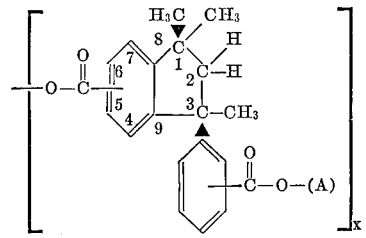

wherein A is a linear hydrocarbon chain of 2 to 10 methylene groups or a saturated ring having 4 to 6 ring methylene groups or a methylene-arylene-methylene group of the formula: —$(H_2C)_a$—arylene—$(CH_2)_a$— wherein $a$ is an integer of 1 to 5 and "arylene" is a divalent aromatic hydrocarbon group; and $x$ is at least 30 and up to 300 or more. In the above structure the heavy and light single carbon-to-hydrogen and carbon-to-carbon bonds are used to designate that the hydrogens or substitutent on the ring carbons extend in opposite directions from the plane of the indane structure, which for the present purposes is the same as the plane of the paper. The light bonds can be considered as indicating extending downward and the heavy bonds can be extending upward from the plane of the indane structure. The precise ring positions of the —COO— group on the benzene ring of the indane and the —COO(A)—group on the 3 phenylene substituent are not indicated in the above structure. The —COO— group on the benzene ring of the indane can be on the 4, 5, 6 or a 7 ring position carbon of the indane and the —COO(A)— group on the 3-phenylene substituent can be on the ring carbon ortho-, meta- and para- to the ring carbon attached to the 3-ring carbon of the indane.

It is before indicated that the carboxy indane portion of the macropolyesters of this invention is in a single plane. The fuzed indane ring structure has been known for some time to be in a single plane and to be a rigid structure. The substituents on the carbons in the 1, 2 and 3-ring position, i.e. hydrogens, methyl groups and phenylene group are also rigidly fixed with respect to that single plane of the indane structure and can extend only upwardly or downwardly from the plane of the indane structure. This requires that the

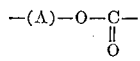

substituted phenyl substituent on the 3-indane carbon extend away from the planar rigid indane structure. Thus the indicated free valence of A satisfied by the indicated free valence of the —COO— substitutent on the benzene ring of the indane structure results in macropolyesters of unusual properties.

The carboxyphenyl indane carboxylic acids, from which the macropolyesters of this invention are made, possess the same spacial structure as discussed above, the carboxyphenyl substituent extending away from the single plane of the rigid fuzed ring indane. Thus this spacial configuration has led many to believe that the reaction of these acids with dihydroxy methylene compounds would produce internally plasticized, relatively low molecular weight products which would not be suitable for casting as a film or extruding as a fiber filament. However, the macropolyesters of this invention are high melting, and are suitable for use in the preparation of clear films and for spinning into fiber filaments. For example, an ethylene glycol derived polyester of this invention having a molecular weight of 10,300 (M.P. of 160° C.) can be cast as a film from benzene solution to give a bright, clear film. Also a melt of the same 10,300 molecular weight polyester can be pressure extruded through a spinnerette to form fiber filaments. The filaments spun from polyester of this invention to the touch more nearly resemble the warmth and resilience feel of wool than the cool, slick feel of polyethylene terephthalate and polyolefin fibers. The foregoing physical properties are unobvious from a consideration of the special configuration of the acids from which they are derived.

The aforementioned spacial configuration causing the carboxyphenyl substituent to project away from the single plane of the indane structure continues, of course, into the polyesters of this invention resulting in a somewhat stepwise zigzag chain in the molecule. This stepwise zigzag is greater when the carboxy group in the carboxyphenyl substituent is on the ring carbon in the para position and is least when on the ring carbon in the ortho position. This stepwise zigzag shape in the molecule chains is rigidly fixed by the chemical structure and thus provide a chemical structural built-in permanent crimp whose ultimate strength is only limited by the strength of the carbon-to-carbon bond linking the substituent 3-(phenylene ring) to the 3-carbon of the indane. The macropolyesters of this invention derived from 3-(p-carboxyphenyl)-1,1,3-trimethylindane carboxylic acids provide the deepest step from the single plane of the indane and thus impart the greatest range of built-in crimp resilience. That is, the amount the filament can be stretched and still return to original length is greater for the polyesters from the 3-(p-carboxyphenyl) indane carboxylic acids than for the 3-(o-carboxyphenyl) indane carboxylic acids.

The macropolymethylene phenylcarboxylate indane carboxylate polyesters of this invention can be derived, for example, from 3-(o-carboxyphenyl)-1,1,3-trimethyl-4-indane carboxylic acid,
3-(m-carboxyphenyl)-1,1,3-trimethyl-4-indane carboxylic acid,
3-(p-carboxyphenyl)-1,1,3-trimethyl-4-indane carboxylic acid,
3-(o-carboxyphenyl)-1,1,3-trimethyl-5-indane carboxylic acid,
3-(m-carboxyphenyl)-1,1,3-trimethyl-5-indane carboxylic acid,
3-(p-carboxyphenyl)-1,1,3-trimethyl-5-indane carboxylic acid,
3-(o-carboxyphenyl)-1,1,3-trimethyl-6-indane carboxylic acid,
3-(m-carboxyphenyl)-1,1,3-trimethyl-6-indane carboxylic acid,
3-(p-carboxyphenyl)-1,1,3-trimethyl-6-indane carboxylic acid,
3-(o-carboxyphenyl)-1,1,3-trimethyl-7-indane carboxylic acid,
3-(m-carboxyphenyl)-1,1,3-trimethyl-7-indane carboxylic acid, and
3-(p-carboxyphenyl)-1,1,3-trimethyl-7-indane carboxylic acid.

Indane carboxylic acids having carboxyphenyl substituents on the 1 and 2 carbons can also be used because these will possess the same spacial structure of the above named compounds. As indicated before the p-carboxyphenyl substituted indane carboxylic acids will provide the maximum permanent built-in crimp or resilience. For this reason the p-carboxyphenyl substituted indane carboxylic acids are preferred as the starting dicarboxylic acid reactants. Of these preferred dicarboxylic acids, 3-(p-carboxyphenyl)-1,1,3-trimethyl - 5 - indane carboxylic acid is soon to be commercially available of a purity (above 99 mole percent pure) suitable for polyester preparation.

The diol reactant useful for the preparaiton of the macropolyesters of this invention are generically methylene diols of the formula HO—A—OH wherein A has the same meaning as defined with respect to the polymer unit. These diols contain 2 to 10 carbon atoms and, other than the two hydroxy groups, contain only carbon and hydrogen atoms. When A is a $C_2$ to $C_{10}$ linear hydrocarbon chain, the diol reactant includes ethylene glycol, 1,3-propane diol, 1,2-propane diol, 1,2-butane diol, 1,3-butane diol, 1,4-butane diol, the pentane diols, hexane diols, heptane diols, octane diols, nonane diols, and the decane diols. When A is a saturated $C_3$ to $C_6$ ring, the diol reactant includes cyclopropane diols, cyclopentane diols and cyclohexane diols of which 1,4-cyclohexane diol is preferred. When A contains an arylene (divalent aromatic hydrocarbon group) between two hydroxymethyl terminal groups, the diol reactant is bis-(methylol) benzene (or $\alpha,\alpha'$-dihydroxyxylene), p-(2-hydroxyethyl) benzyl alcohol, p-(3-hydroxypropyl) benzyl alcohol, p-(2-hydroxypropyl) benzyl alcohol, 1,4-di(2-hydroxyethyl) benzene. All of these diols even those having a phenylene group between the two methylol groups, and between the 2-hydroxyethyl and methylol groups, between the two 2-hydroxyethyl groups, between the hydroxypropyl and the methylol groups are polymethylene diols.

The melting point of the macropolyesters of this invention increases as molecular weight increases. But for a constant number of units in the molecule the melting point of the polyester can be increased by the selection of type of diol reactant. Polymer melting points increase from those derived from linear diols of ethylene glycol series to those derived from bis-methylol benzene, to those derived from a mixture of cis- and trans-1,4-cyclohexane diol to those derived from all trans-1,4-cyclohexane diol, to those derived from di-(2-hydroxyethyl) benzene and higher di-(hydroxyethyl) benzenes.

The macropolyesters of this invention are prepared by first heating an esterification reaction mixture of 2 or more moles of the diol for each mole of carboxyphenyl indane carboxylic acid at a temperature of at least the normal boiling point of the diol in the absence of a catalyst or in the presence of an esterification catalyst, such as the polycondensation catalysts used in the preparation of polyethylene terephthalate, for example, antimony trioxide. The product of this esterification reaction is further heated to remove unreacted diol, while the pressure is reduced ultimately to 0.1 to 5 mm. Hg absolute as a second step polycondensation. The diol which splits out during polycondensation is removed. The polycondensation is continued until the desired molecular weight polyester is produced. As polycondensation progresses and molecular weight increases, the polyester product becomes more and more viscous. This viscosity increase can be conveniently used as a means for following the molecular weight increase. For example, into the polycondensation reaction mixture is inserted a stirring means driven by an electric motor whose power consumption is measured. As the viscosity of the reaction mixture increases, the motor power consumption increases. The power consumption can be calibrated against viscosity and/or molecular weight. Thus a polycondensation from the same starting materials carried out to the same stirrer power consumption will provide polyester of substantially the same molecular weight time after time.

The first or esterification reaction is preferably carried out under superatmospheric pressure of 10 to 200 p.s.i.g. or more. By-product water is retained to reduce bis (diol) ether formation. A small amount of water can also be added with the reactants to aid in suppression of bis (diol) ether formation. It is also advantageous to add to the esterification an alkali metal hydroxide, preferably sodium hydroxide, to aid in suppressing bis (diol) ether formation. The esterification need not be carried out to substantial completion but rather it is suitable to carry out the esterification within the range of 60 to 95%, preferably 80 to 90% of completion, before removing unreacted diol and decreasing the pressure for conducting the polycondensation reaction. The esterification removal of unreacted diol and polycondensation can be conducted continuously by moving the reaction mixtures through suitable zones for accomplishing the required reaction or separation. For high production the reactions and separations of unreacted and split out diol are carried out by moving the mixtures being processed as a thin film over a heated surface or surfaces.

The preparation of the macropolyesters of this invention will be more readily understood from the following illustrative example of one preferred method. In this example PIDA is used to designate 3-(p-carboxyphenyl)-1,1,3-trimethyl-5-indane carboxylic acid.

EXAMPLE 1

The polymer was prepared as follows: 200 g. PIDA, 200 ml. of ethylene glycol (low-conductivity grade), 0.015 g. of antimony trioxide, and 3.3 ml. of ethylene glycol solution containing 0.02 g. of NaOH were charged to a pressure vessel equipped with a stirrer and distillation assembly to remove water from esterification and excess ethylene glycol after esterification was completed. The distillate line was connected to a vacuum system to continue polyesterification. The reactor was then purged with high-purity nitrogen and a 10 p.s.i. nitrogen pad added. The reaction mass was heated to 252° C. and heating was continued to 263° C. over a 40-minute period; pressure rose to 85 p.s.i. At this point, the valve to the distillation section was opened and the water and excess glycol distilled. Vacuum was then applied at a total pressure of about 1 mm. Hg absolute. This pressure included a nitrogen sweep in the amount of 0.5 mm. The polymerization was carried out by increasing the temperature to 273° C. and removing glycol over a period of 1 hour, 45 minutes. At this point, the bottom seal stirrer was removed and replaced with a ten-hole spinnerette. Three hundred and fifty p.s.i.g. of $N_2$ pressure was placed over the polymer and fiber was spun and collected on a wind-up machine.

The fiber thus formed had a soft wool like feel to the hand. The strength was somewhat below normal polyethylene terephthalate fiber strength but is due to a comparatively lower molecular weight of 10,300. The fiber, only slightly crystalline at this stage, had a crystalline melting point of 160° C. as observed by loss of birefringence in a polarizing microscope equipped with a hot stage and a free-flow point of 200° C.

Such a polyester (10,300 molecular weight) has a molecular weight 3.3–4.1 greater than the alkyd resin of Example 12 of U.S. Pat. No. 2,873,262.

This foregoing polymer was cast from a benzene solution and gave a bright, clear film. It can also be extruded and molded. Preparation of polyester by this technique yields a polyester product having very little (0.30%) diethylene glycol ether—0.30%. Thus, it has built into it good oxidation and thermal stability.

EXAMPLE 2

The process of Example 1 is repeated except the polycondensation reaction is conducted until the polyester has a number average molecular weight of 37,500. Fiber is spun through a 10 hole spinnerette at 275° C. and 350 p.s.i.g. nitrogen pressure and collected on a wind-up machine as before to stretch orient the fiber. This fiber has a glass-transition temperature of 153–154° C. and a free-flow temperature of 200° C.

Polyester from Example 2 is cast from a benzene solution and gave a bright, clear film.

One gram of polyester from Example 2 is molded at 200° C. and 4,000 p.s.i.g. into a tough, clear disc having a specific gravity of 1.19.

The polyester ($\overline{M}n$ of 37,500) of Example 2 has a molecular weight of more than 12 to 14 times higher than the alkyd resin of Example 12 of U.S. Pat. No. 2,873,262.

The polyester structure before given wherein A is from ethylene glycol has an $x$ value of about 30 for the polyester of Example 1 and an $x$ value of about 107 for the polyester of Example 2.

Macropolyester of ethylene glycol 3-(p-carboxyphenyl)-1,1,3-trimethyl-5-indane carboxylic acid of molecular weight higher than $\overline{M}n$ 37,500 can be prepared by carrying out the polycondensation reaction until a macropolyester of about 105,000 $\overline{M}n$ is obtained ($x$ is about 300) having a strength comparable to polyethylene terephthalate and poly (mixed cis- trans-cyclohexylene) terephthalate. Higher melting polyesters are obtainable from the esterification of 3-(p-carboxyphenyl)-1,1,3-trimethyl-5-indane carboxylic acid with a mixture of 30% cis-70% trans-1,4-cyclohexane diol, 1,4-bis-methylol benzene, all trans-1,4-cyclohexane diol or 1,4-di-(2-hydroxyethyl) benzene.

What is claimed is:

1. A macropolyester of a 3-(carboxyphenyl)-1,1,3-trimethylindane carboxylic acid consisting of the structure having the repeating units:

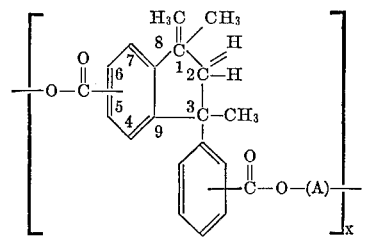

wherein A is a hydrocarbon selected from the class consisting of a linear hydrocarbon chain of 2 to 10 methylene groups, a saturated ring hydrocarbon having 4 to 6 ring methylene groups and a methylene-arylene-methylene hydrocarbon of the formula $$-(H_2C)_a-\text{arylene}-(CH_2)_a-$$

wherein $a$ is an integer of 1 to 5 and arylene is a divalent aromatic hydrocarbon group; and $x$ is at least 30 and up to 300.

2. The polymeric macropolyester of claim 1 wherein A is the divalent ethylene hydrocarbon.

3. The polymeric macropolyester of claim 2 wherein $x$ is about 30 and the polyester has a molecular weight of 10,300.

4. The polymeric macropolyster of claim 2 wherein $x$ is about 107 and the polyester has a number average molecular weight of about 37,500.

References Cited
UNITED STATES PATENTS
2,071,250  2/1937  Carothers  260—106
2,873,262  2/1959  Petropoulos  260—22

OTHER REFERENCES
Hill, Fibres From Synthetic Polymers, Elsevier, N.Y., 1953, pp. 154–157.

WILLIAM H. SHORT, Primary Examiner

M. GOLDSTEIN, Assistant Examiner